(12) United States Patent
Callard et al.

(10) Patent No.: US 10,225,781 B2
(45) Date of Patent: Mar. 5, 2019

(54) METHODS AND SYSTEMS FOR SOFTWARE CONTROLLED DEVICES

(71) Applicant: Huawei Technologies Co., Ltd., Shenzhen (CN)

(72) Inventors: Aaron James Callard, Ottawa (CA); Nimal Gamini Senarath, Ottawa (CA); Alex Stephenne, Stittsville (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 429 days.

(21) Appl. No.: 14/309,693

(22) Filed: Jun. 19, 2014

(65) Prior Publication Data

US 2015/0373687 A1    Dec. 24, 2015

(51) Int. Cl.
*H04W 36/24*   (2009.01)
*H04L 29/08*   (2006.01)
(Continued)

(52) U.S. Cl.
CPC .......... *H04W 36/24* (2013.01); *H04L 67/34* (2013.01); *H04L 69/24* (2013.01); *H04W 24/02* (2013.01);
(Continued)

(58) Field of Classification Search
CPC ........ H04L 67/34; H04L 69/24; H04W 36/24; H04W 36/32; H04W 72/0406;
(Continued)

(56) References Cited

U.S. PATENT DOCUMENTS 7,769,915 B1 *   8/2010   McCloskey ............ G01D 4/004
                                                              379/32.01
2005/0144459 A1   6/2005   Qureshi et al.
(Continued)

FOREIGN PATENT DOCUMENTS

CN          1889573 A       1/2008

OTHER PUBLICATIONS

"ANTS: A Toolkit for Building and Dynamically Deploying Network Protocols," IEEE Conference on Open Architectures and Network Programming (OPENARCH 98), Apr. 1998, 12 pages.
(Continued)

*Primary Examiner* — Rina C Pancholi
(74) *Attorney, Agent, or Firm* — Slater Matsil, LLP

(57) ABSTRACT

Spoofed radio control signaling instructions can be used to dynamically adapt management of the radio interface by radio control processors. More specifically, spoofed radio control signaling can be communicated to an accelerator application instantiated on a device-side of a radio control processor. The accelerator application can pre-process the spoofed radio control signaling before forwarding the instructions to a generic radio control processor. In one example, the generic radio control processor has a universal configuration that is capable of being adapted to different telecommunication protocols based on the spoofed radio control signaling. In another example, the spoofed radio control channel signaling is translated into control instructions at the accelerator application, which are forwarded to the generic radio control processor. The control instructions govern processing of downlink data channel transmissions and/or specify parameters of uplink transmissions.

19 Claims, 9 Drawing Sheets

(51) Int. Cl.
*H04L 29/06* (2006.01)
*H04W 72/04* (2009.01)
*H04W 92/10* (2009.01)
*H04W 92/12* (2009.01)
*H04W 24/02* (2009.01)
*H04W 36/32* (2009.01)

(52) U.S. Cl.
CPC ........ *H04W 36/32* (2013.01); *H04W 72/0406* (2013.01); *H04W 92/10* (2013.01); *H04W 92/12* (2013.01)

(58) Field of Classification Search
CPC ... H04W 72/048; H04W 92/10; H04W 92/12; H04W 24/02; H04W 88/06
See application file for complete search history.

(56) References Cited

U.S. PATENT DOCUMENTS

| | | | |
|---|---|---|---|
| 2006/0079178 A1* | 4/2006 | Palin | H04L 5/0044 455/41.2 |
| 2006/0198336 A1* | 9/2006 | Major | H04W 88/06 370/328 |
| 2006/0217121 A1* | 9/2006 | Soliman | H04W 16/32 455/446 |
| 2008/0151844 A1 | 6/2008 | Tiwari | |
| 2008/0151894 A1 | 6/2008 | Tiwari | |
| 2011/0107417 A1 | 5/2011 | Balay et al. | |
| 2011/0243023 A1* | 10/2011 | Taoka | H04L 5/0023 370/252 |
| 2012/0115493 A1* | 5/2012 | Matada | H04W 72/048 455/450 |
| 2014/0029536 A1* | 1/2014 | Tian | H04W 28/24 370/329 |
| 2015/0245325 A1* | 8/2015 | Futaki | H04W 72/04 370/329 |

OTHER PUBLICATIONS

"Cell Reselection Procedures in LTE," LTE Encyclopedia, retrieved Jun. 19, 2014, 3 pages retrieved from https://sites.google.com/site/lteencyclopedia/cell-reselection-procedures-in-lte.

Andrus, J., et al., "Cells: A Virtual Mobile Smartphone Architecture," in Proceedings of the 23rd ACM Symposium on Operating Systems Principles, Oct. 23, 2011, 15 pages.

Click Modular Router, Sep. 24, 2011, 1 page retrieved from http://www.read.cs.ucla.edu/click/click.

Gribble, S., et al., "The Ninja Architecture for Robust Internet-scale Systems and Services," Computer Networks: The International Journal of Computer and Telecommunications Networking, V.35, No. 4, pp. 473-497, Mar. 2001.

Netserv, 2009-2010 Columbia University, 2 pages retrieved from http://www.cs.columbia.edu/irt/project/netserv/.

"Network Functions Virtualization," Wikipedia: The Free Encyclopedia. Wikimedia Foundation, Inc., http://en.wikipedia.org/wiki/Network_Functions_Virtualization, 3 pages. Last update Jun. 18, 2014.

Bansal, M., et al., "OpenRadio: A Programmable Wireless Dataplane," in Hot Topics in Software Defined Networks, pp. 109-114, Aug. 2012.

J. Smith, SwitchWare: Towards a 21st Century Network Infrastructure, 18 pages. [online] Available: http://www.cis.upenn.edu/~switchware/papers/sware.ps.

Campbell, A., "The Mobiware Toolkit," In Fourth International Workshop on High Performance Protocol Architectures (HIPPARCH•98), London. Jun. 1998, 12 pages.

Wiseman, C., et al., "A Remotely Accessible Network Processor-Based Router for Network Experimentation," Proceedings of the 4th ACM/IEEE Symposium on Architectures for Networking and Communications Systems, 10 pages, Nov. 2008.

International Search Report and Written Opinion received in International Application No. PCT/CN2015/081574 dated Sep. 8, 2015, 12 pages.

* cited by examiner

METHODS AND SYSTEMS FOR SOFTWARE CONTROLLED DEVICES

TECHNICAL FIELD

The present invention relates generally to managing the allocation of resources in a network, and in particular embodiments, to methods and systems for software controlled devices.

BACKGROUND

Today's wireless devices typically include dedicated radio control processor hardware for managing a radio interface between the mobile device and a core network access point. Notably, the radio control processor hardware is normally pre-configured to recognize, and operate in accordance with, radio control signaling communicated directly from the access point, and as a consequence, the hardware configuration of the radio control processor is largely influenced by a particular version of a specific standard telecommunication protocol. As a result, legacy radio control processors may be unable to realize benefits from updated versions of the standard. For example, legacy radio control processors configured for Third Generation Partnership Project (3GGP) Long Term Evolution (LTE) Release 10 may be unable benefit from performance enhancements introduced by 3GGP LTE Release 11. Moreover, conventional mobile devices may require multiple dedicated radio control processors to obtain multi-protocol communications capability. For these and other reasons, more flexible techniques for managing over-the-air interfaces on the device-side of radio access network are desired.

SUMMARY OF THE INVENTION

Technical advantages are generally achieved, by embodiments of this disclosure which describe methods and systems for software controlled devices.

In accordance with an embodiment, a method for managing an over-the-air interface is provided. In this example, the method includes establishing a radio connection between a wireless interface of a mobile device and an access point, receiving radio control signaling from the access point over a network-side port of the radio control processor and receiving spoofed radio control signaling from a device-side component over a device-side port of a radio control processor. The device-side component is coupled to the device-side port of the radio control processor. The method further includes managing the radio connection between the mobile device and the access point in accordance with configuration instructions carried by both the radio control signaling and the spoofed radio control signaling. An apparatus for performing this method is also provided.

In accordance with another embodiment, a mobile device adapted for wireless communications is provided. In this example, the mobile device includes a wireless interface for establishing a radio connection between the mobile device and an access point of a core network, a device-side component, and a radio control processor for managing the radio connection between the mobile device and the core network. The radio control processor includes a network-side port communicatively coupled to the wireless interface and a device-side port communicatively coupled to the device-side component. The radio control processor is configured to receive a data channel transmission from the access point over the network-side port, and to receive control channel signaling from the device-side component over the device-side port. The radio control processor is further configured to perform an uplink transmission in accordance with configuration instructions carried by the control channel signaling received from the device-side component.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
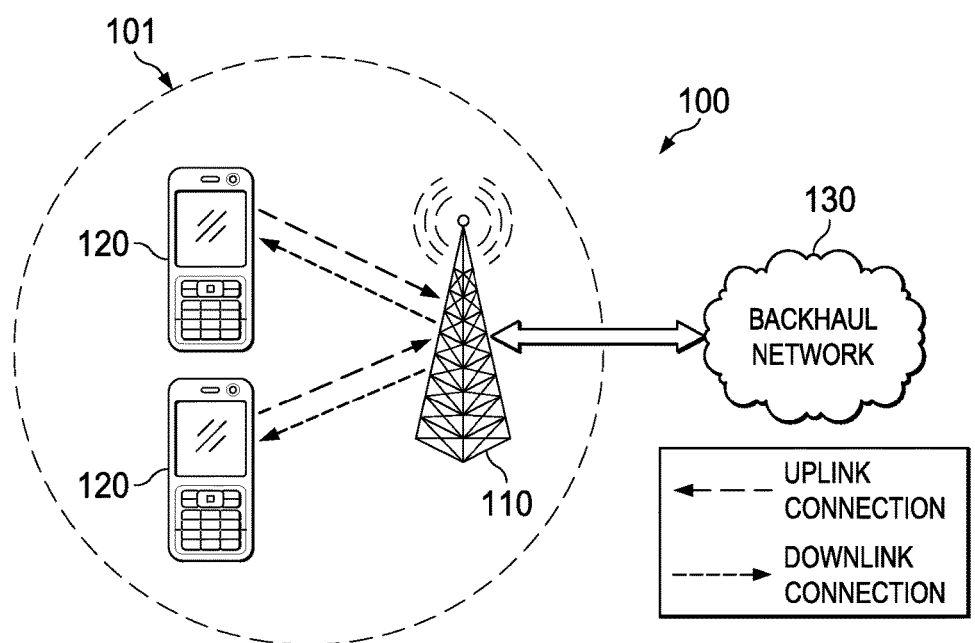
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. The term "radio interface" is used herein to refer to wireless connections in any frequency spectrum, including bands outside the traditional radio spectrum, e.g., Wi-Fi, Bluetooth, etc.)

Radio control processors are positioned in-between a wireless interface and an operating system of the mobile device, and generally behave as an intermediary between the mobile device and the core network. More specifically, radio control processors may manage a radio connection (or air-interface) between the mobile device and the core network access point based on radio control signaling received from the core network. In conventional systems, radio control signaling is communicated directly from the core network access point to the radio control processor. Since there is no intermediary, the radio control processing hardware must generally be pre-configured to implement control signaling instructions in the manner specified by protocols of the corresponding telecommunication standard.

While this conventional approach leverages performance advantages of hardware to achieve faster radio interface convergence (e.g., swifter implementation of radio control instructions, etc.), it also restricts the ability of the radio control processors to adapt to new and/or updated telecommunication protocols. For example, while 3GGP LTE Release 11 may be backwards compatible, it may be impractical to update legacy mobile devices configured for 3GGP LTE Release 10 to utilize the new features (e.g., ePDCCH, etc.) provided by 3GGP LTE Release 11. As such, mechanisms for adapting radio control processors to operate in accordance with different wireless protocols are desired.

Disclosed herein are techniques for utilizing spoofed radio control signaling instructions to dynamically adapt management of the radio interface by radio control processors. Aspects of this disclosure communicate spoofed radio control signaling to an accelerator application instantiated on a device-side of a radio control processor, which pre-processes the spoofed radio control signaling before forwarding the instructions to a generic radio control processor. The generic radio control processor may have a universal configuration that is capable of being adapted to multiple standards and/or updated versions of a specific standard. The degree to which the generic radio control processor's configuration maps to a specific standard (or family of standards) may vary across different implementations. For example, an embodiment radio control processor may comprise hardware that is pre-configured to recognize relationships between a control channel and data channel (e.g., control channel carries scheduling information for data channel), but that is capable of being adapted (e.g., via spoofed control signaling) to recognize different locations of the control and channels within a frame. This may allow for the dynamic implementation of different frame configurations. As another example, the radio control processor may comprise hardware that is capable of being adapted for different handover protocols. In an embodiment, control channel signaling passes through the accelerator application of a device side component, where it is translated into control instructions for the radio control processor. The translated control instructions may govern processing of a downlink data channel transmission by the radio control processor, e.g., frame formats, assignments, etc. The translated control instructions may also specify parameters of an uplink transmission of the radio control processor, e.g., power control, assignments, feedback channel format, etc. These and other aspects are discussed in greater detail below.

FIG. 1 illustrates a network 100 for communicating data. The network 100 comprises an access point 110 having a coverage area 101, a plurality of mobile devices 120, and a backhaul network 130. The access point 110 may comprise any component capable of providing wireless access by, inter alia, establishing uplink (dashed line) and/or downlink (dotted line) connections with the mobile devices 120, such as a base station, an enhanced base station (eNB), a femtocell, and other wirelessly enabled devices. The mobile devices 120 may comprise any component capable of establishing a wireless connection with the access point 110, such as a mobile station, a user equipment (UE), and other wirelessly enabled devices. The backhaul network 130 may be any component or collection of components that allow data to be exchanged between the access point 110 and a remote end (not shown). In some embodiments, the network 100 may comprise various other wireless devices, such as relays, femtocells, etc.

Figure 2:
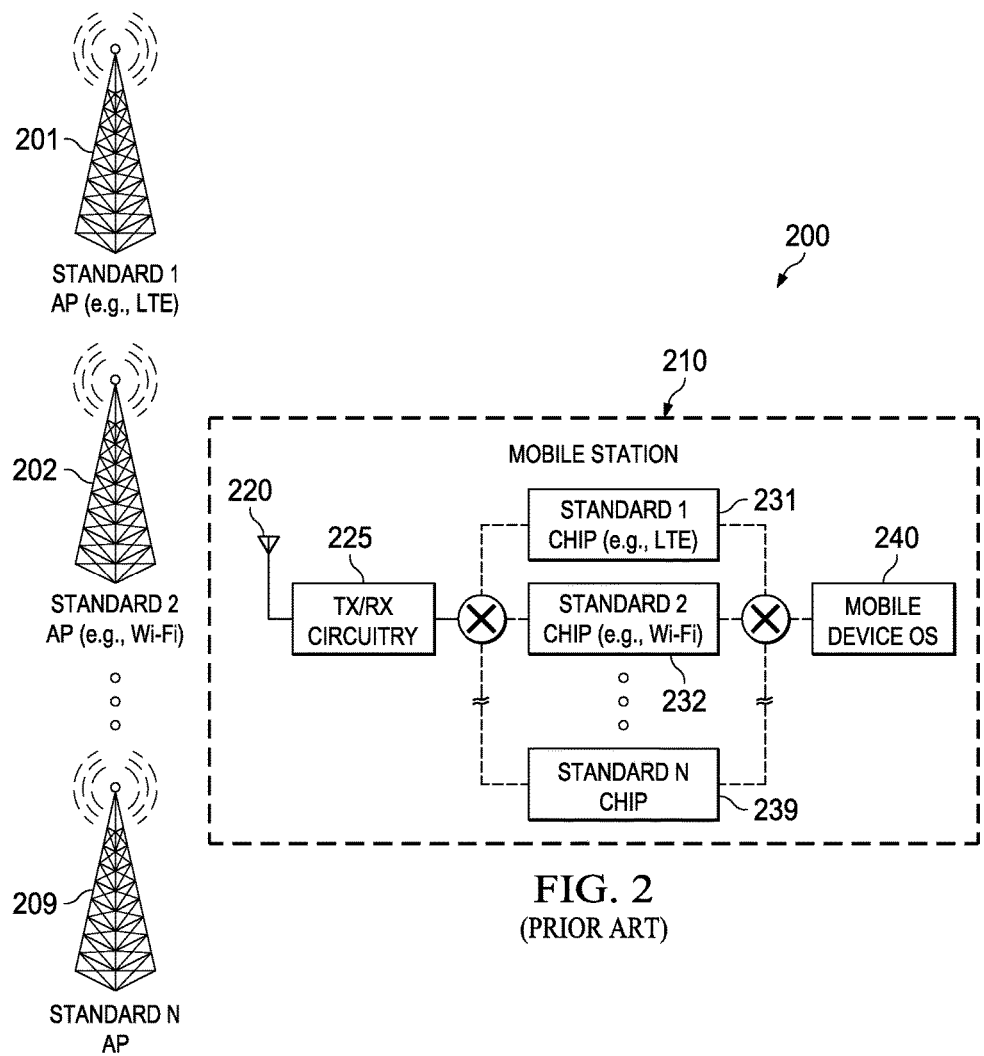
FIG. 2 illustrates a diagram of a conventional wireless system comprising a mobile station configured to communicate in accordance with different communications protocols.

Conventional mobile devices typically include a different standard-specific chip-set (e.g., radio control processor) for each telecommunications protocol with which they are capable of communicating. FIG. 2 illustrates a conventional wireless system 200 comprising a mobile station 210 configured to communicate with access points 201-209 in accordance with N different communications protocols (where N is an integer greater than one). As shown, the mobile station 210 comprises a wireless interface 220, transceiver circuitry 225, a plurality of radio control processors 231-239, and an operating system 240. The radio control processor 231 is configured to communicate with the access point 201 in accordance with a first communications protocol, the radio control processor 232 is configured to communicate with the access point 202 in accordance with a second communications protocol, and the radio control processor 239 is configured to communicate with the access point 209 in accordance with an $N^{th}$ communications protocol. Although it is possible to activate multiple ones of the radio control processors 221, 222, 229 in some circumstances, the mobile station 210 may typically activate only one of the radio control processors 231, 232, 239 at a time. When activated, the radio control processors 221, 222, 229 are pre-configured to manage a radio interface between the mobile device 210 and a corresponding one of the access points 201-209 based on radio control signaling received directly from that access point. Accordingly, the radio control processors 221, 222, 229 are have a hardware configuration that is narrowly tailored to a specific telecommunications standard.

Figure 3A:
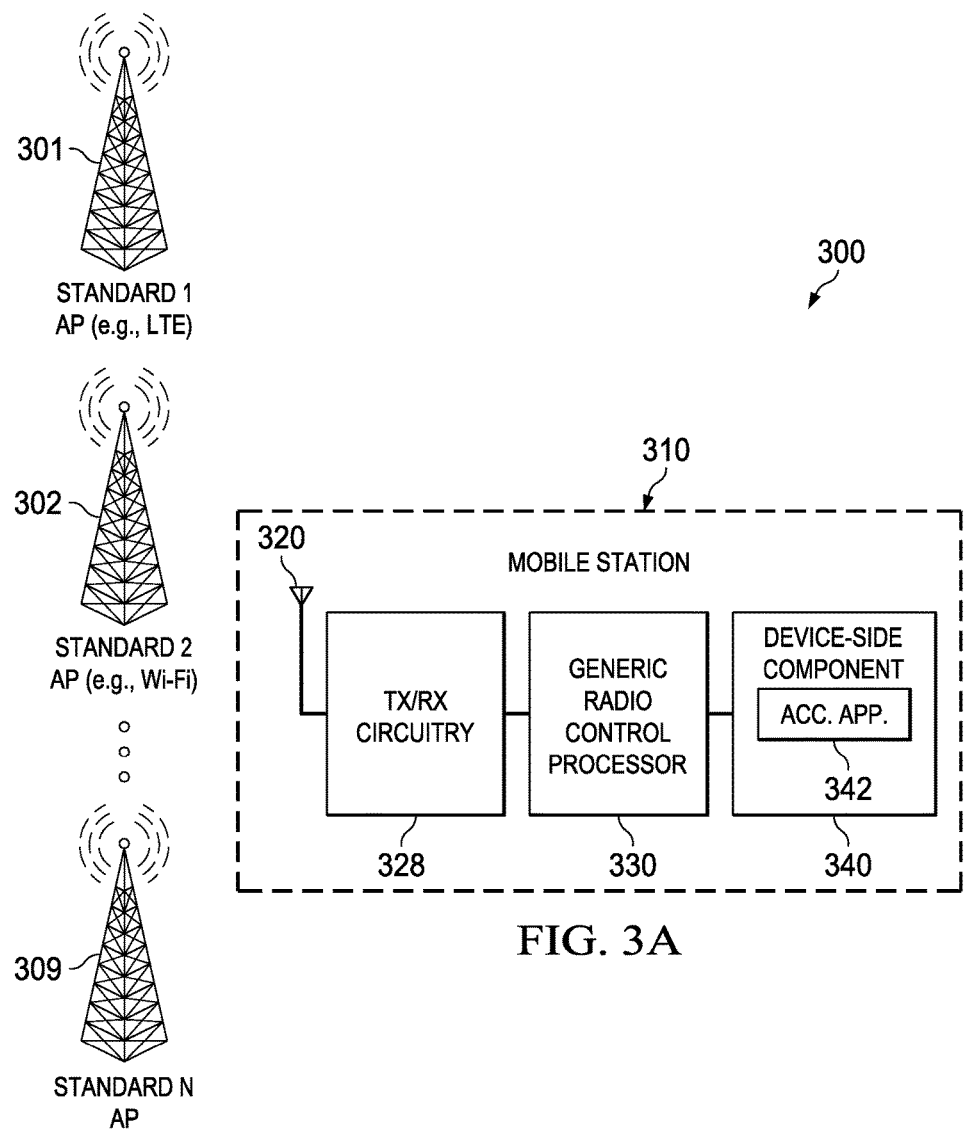
FIGS. 3A-3B illustrate diagrams of an embodiment wireless system comprising a mobile station configured to communicate in accordance with different communications protocols.

Aspects of this disclosure dynamically adapt the operability of radio control processors via spoofed radio control signaling. The spoofed control signaling may be communicated to an accelerator application instantiated on a device-side component, which may pre-process the spoofed control signaling prior to forwarding it to the radio control processor. FIG. 3A illustrates an embodiment network 300 comprising a mobile station 310 configured to communicate with access points 301-309 using different telecommunications communications protocols. As shown, the mobile station 310 comprises a wireless interface 320, transceiver circuitry 325, a generic radio control processor 330, a device side component 340, and an accelerator application 342 instantiated on the device side component 340. As discussed herein, the term "radio control processor" includes any component configured to manage over-the-air functionality of a wireless interface on mobile device, e.g., a baseband processor. Unless otherwise specified, the term "radio control processor" encompasses devices that manage wireless interfaces in any frequency band, including those outside of the traditional radio spectrum, such as Wi-Fi and Bluetooth interfaces. The term "device-side component" includes any component coupled to a device-side port of the radio control processor, such as an application processor (AP). The term "device-side port" is used herein to refer to any signaling port of a radio control processor other than interfaces/ports coupling the radio control processor to a wireless interface or transceiver circuitry.

Figure 3B:
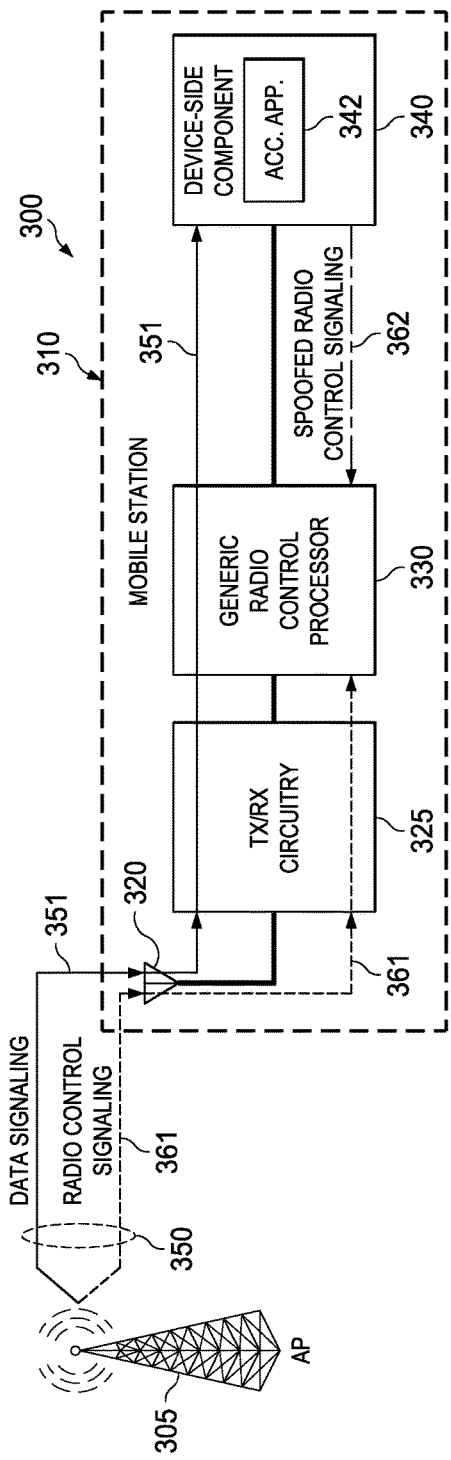

FIG. 3B illustrates how radio control signaling 361 and spoofed radio control signaling 362 are communicated to the generic radio control processor 330. As shown, a wireless transmission 350 carrying data signaling 351 and radio control signaling 361 is communicated to the generic radio control processor 350 from an access point 305 via the wireless interface 320 and the transceiver circuitry 325. The data signal 351 is passed through the generic radio control processor 330 to the device side component 340, while the radio control signaling 361 is processed at the generic radio control processor 330, which also receives the spoofed radio control signaling 362 from the accelerator application instantiated on the device side component 340. Notably, the generic radio control processor 330 manages the radio interface extending between the AP 305 and the wireless interface 320 based on configuration instructions carried by the spoofed radio control signaling 362 and the radio control signaling 361.

In some embodiments, the spoofed radio control signaling 362 is carried in the data signaling 351, and is distributed to the accelerator application 342 when the data signaling 351 is communicated to the device side component 340. In this manner, spoofed radio control signaling 362 communicated by the AP 305 via downlink signaling is passed through the generic radio control processor 330 for further processing by the accelerator application 342. In other embodiments, the spoofed radio control signaling 362 is communicated to the wireless interface 320 from a device other than the AP 305, e.g., another mobile device via device-to-device (D2D) signaling, a relay, a WiFi router, a different AP using a different carrier, etc. In yet other embodiments, the spoofed radio control signaling 362 is communicated over a different interface, e.g., wireline interface, Bluetooth interface, WiFi, user input, etc.

Notably, the spoofed radio control signaling 362 is pre-processed by the accelerator application 342 prior to being communicated to the generic radio control processor. The generic radio control processor 330 may have a static hardware configuration, while the accelerator application 342 may have an upgradeable software configuration. As such, the accelerator application 342 can translate the signaling instructions carried in the spoofed radio control signaling 342 into a form that is understood by the generic radio control processor 330, thereby allowing the operability of the generic radio control processor 330 to be modified/updated through software updates to the accelerator application 342. In some embodiments, the accelerator application 342 independently generates some or all of the spoofed radio control signaling 342 with limited or no guidance from the core network.

Figure 4:
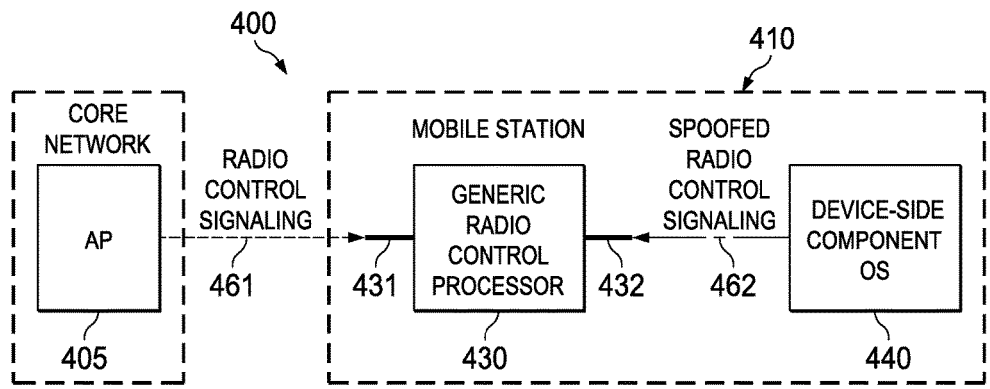
FIG. 4 illustrates a diagram of an embodiment wireless system comprising a radio control processor configured to adaptively manage a radio interface using spoofed radio control signaling.

FIG. 4 illustrates an embodiment network 400 in which a radio control processor 430 is configured to manage a radio interface between an access point 405 and a mobile station 410 based on radio control signaling 461 and spoofed radio control signaling 462. As shown, the radio control signaling 461 is received from the access point 405 via a network-side interface 431 of the radio control processor 430, while the spoofed radio control signaling 462 is received from a device side component 440 via a device-side interface 432 of the radio control processor 430.

Spoofed radio control signaling may be used in a variety of different ways to adapt the management of a radio interface by a radio control processor. For example, spoofed radio control signaling can be used to configure/re-configure the radio control processor to use different communication protocols/techniques, e.g., different cell-re-selection/handover protocols, different idle/paging techniques, etc. As another example, spoofed radio control signaling can be used to configure the radio control processor to recognize, and operate in accordance with, different over-the-air signaling parameters, e.g., parameters embedded within traditional radio control signaling received directly from the core network, etc. As yet another example, spoofed radio control signaling can be used to configure the radio control processor to recognize, and operate in accordance with, different over-the-air signaling channel/frame formats, e.g., orthogonal frequency division multiple access (OFDMA), code division multiple access (CDMA), etc. As yet another example, spoofed radio control signaling can be used to communicate delay-tolerant control information, e.g., paging/cell associations, etc., in a more efficient manner.

Figure 5:
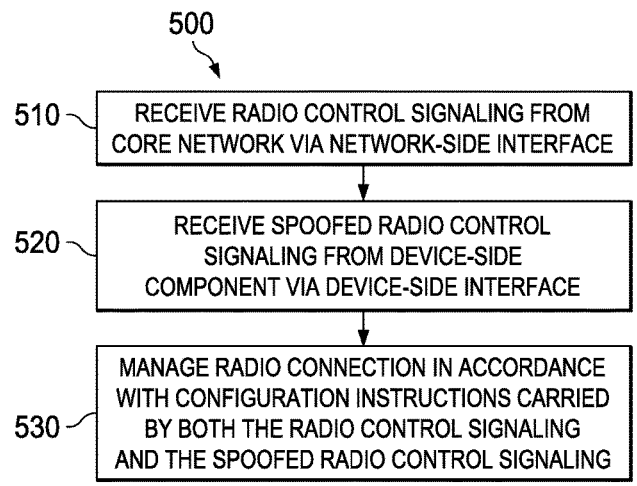
FIG. 5 illustrates a flowchart of an embodiment method for managing a radio interface based on spoofed radio control signaling.

FIG. 5 illustrates a method 500 for managing a radio interface between a core network access point and a mobile station, as may be performed by a radio control processor of the mobile station. As shown, the method 500 begins with step 510, where the radio control processor receives radio control signaling from the core network via a network-side interface. Thereafter, the method 500 proceeds to step 520, where the radio control processor receives spoofed radio control signaling from a device-side component via a device-side interface. Subsequently, the method 500 proceeds to step 530, where the radio control processor manages a radio connection in accordance with configuration instructions carried by both the radio control signaling and the spoofed radio control signaling. In an embodiment, the signal received in step 510 may be an authorization message which grants the device side component authority to send various messages. In another embodiment, the radio control signaling may be excluded entirely, with all radio interface configuration instructions being communicated via the spoofed radio control signaling received from the network-side interface. In an embodiment, the radio control signaling received in step 510 may configure multiple radio connections. As an example, the if, For instance, the radio control signaling may establish semi-static resource assignments, in which case a single message from the network could correspond with many radio configurations (e.g., spoofed X-PDSCH). In another embodiment, radio control signaling received in step 510 may configure a single connection with only a few messages, which may be advantageous in that the configuration can occur when the network is under-loaded.

Figure 6:
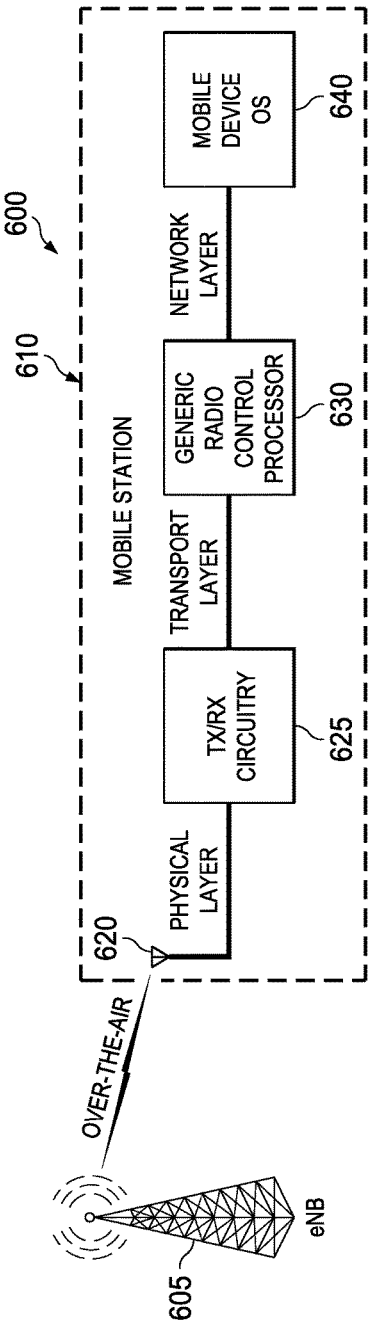
FIG. 6 illustrates a diagram of an embodiment LTE network configured for adaptive management of a radio interface using spoofed radio control signaling.

FIG. 6 illustrates an embodiment LTE network 600 configured for adaptive management of a radio interface between an enhanced base station (eNB) and a mobile station 610 by a radio control processor 630. As shown, an over-the-air interface (or radio interface) carries radio signals between the eNB 605 and the wireless interface 620. Radio signals are transported over the physical layer between the wireless interface 620 and the transceiver circuitry 625, over the transport layer between the transceiver circuitry 625 and the radio control processor 630, and over the network layer between the radio control processor 630 and the mobile device operating system (OS) 640. As such, within the context of LTE network 600, the radio control processor 630 may receive radio control signaling over the transport layer, and spoofed radio control signaling over the network layer.

Figure 7:
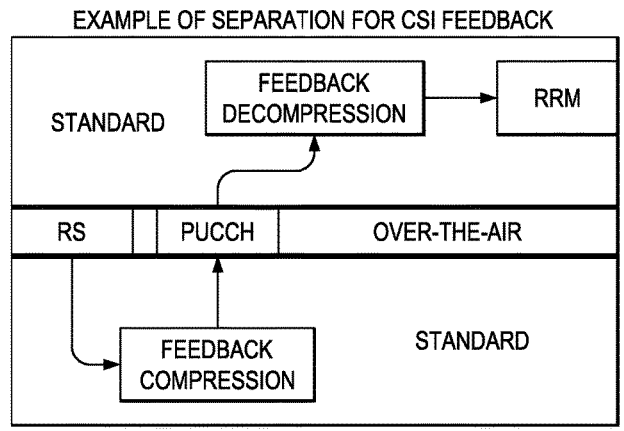
FIG. 7 illustrates a diagram of an embodiment configuration for adapting channel state information (CSI) feedback in LTE networks.

FIG. 7 illustrates a diagram depicting an embodiment configuration for adapting channel state information (CSI) feedback in LTE networks. In some embodiments, this configuration may be used to separate protocol for obtaining CSI feedback from next generation standard specifications. In this example, the feedback block for communicating the CSI feedback to a radio resource management block can be moved into software such that a variety of feedback schemes can be supported without changing the standard. This principal can be applied broadly by breaking a wireless communication protocol into a series of components/blocks (e.g., reference signals (RS), physical uplink control channels (PUCCH), etc.), each of which serving a general purpose. In an embodiment, a telecommunication standard may define a relationship between the blocks, while the algorithms/techniques applied within the blocks may be configurable through software, e.g., pre-processing of spoofed control signaling by an accelerator application. In another embodiment, a telecommunication standard may define the inputs/outputs of the blocks, while the manner in which the blocks actually transform inputs to outputs may be configurable through software. The internal functions of the component blocks may be excluded from the standard entirely. Conversely, the standard may define default configurations for the component blocks, which may be reconfigurable via spoofed control signaling.

Figure 8:
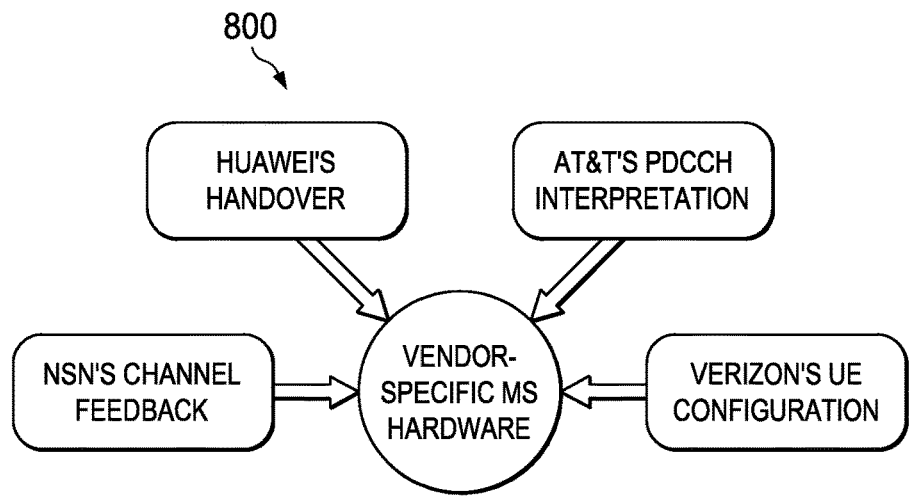
FIG. 8 illustrates a diagram depicting an embodiment communications protocol for adapting a mobile station to use communications protocols/algorithms defined by various vendors.
Figure 9:
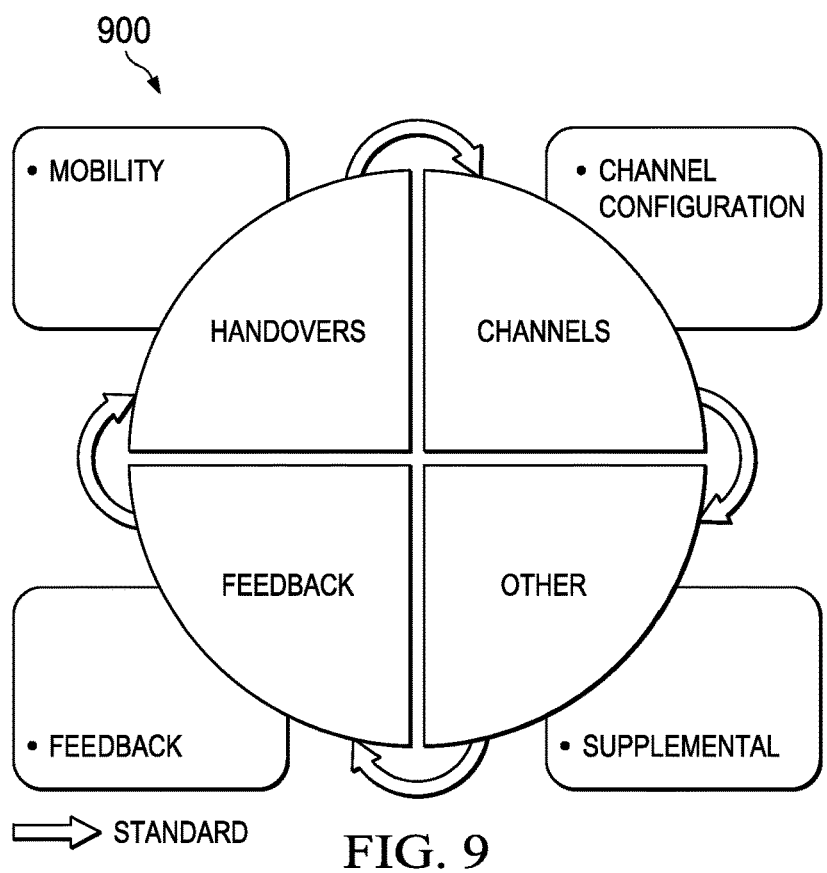
FIG. 9 illustrates a diagram depicting an embodiment communications protocol for governing the interfaces between modules.

FIG. 8 illustrates a diagram depicting an embodiment communications protocol 800 for adapting a mobile station to use algorithms defined by various vendors through the implementation of accelerator software applications on the mobile station's operating system. By separating the software from the hardware the algorithms could come from different vendors. In some embodiments, vendor specific algorithms would also be installed at the access point to enable enhanced schemes. FIG. 9 illustrates an embodiment communications protocol 900 or governing the interfaces between accelerator applications without governing the algorithms/processing performed by those accelerator applications. In some embodiments, the mobility accelerator application may be configured to define the handover protocols, the channel-configuration accelerator application may be configured to define control and data channel formats (e.g., frame/channel configurations, etc.), and the feedback accelerator application may be configured to define other formats. In an embodiment, each accelerator component may be configured to directly interact with other accelerator applications, with the standard defining the manner in which those interactions take place. Hence, the standard may simply represent an interface between programmable accelerator applications. The embodiment communications protocol 900 may be more adaptable than the embodiment communications protocol 800. For example, devices operating in accordance with embodiment communications protocols 800, 900 may receive X bits, and then translate them into a control channel format defined by the embodiment communications protocols 800, 900. The device operating in accordance with the embodiment communications protocol 800 may process the control channel using techniques defined by the standard (i.e. turbo code decoding on resources X, etc.), while the devices operating in accordance with the embodiment communications protocol 900 may process the control channel using techniques defined by the accelerator application.

Aspects of this disclosure enable mobile devices to use accelerator applications (e.g., configurable software applications) to control radio interface management protocols implemented by radio control processors. Generally speaking, accelerator applications may translate spoofed radio control signaling received from the core network (or another source) into spoofed radio control signaling instructions, which are communicated to the radio control processor for the purpose of managing the radio interface. Since it is possible to modify existing accelerator applications and/or introduce new accelerator applications through software downloads/updates, the operability of radio control processors can be adapted without changing their hardware configurations (which may be difficult to reconfigure outside of a factory setting). Consequently, aspects of this disclosure enable the revolution of next-generation telecommunications protocols, which may adopt "hooks" for allowing the implementation/adaptation of different radio interface management protocols.

In some embodiments, aspects of this disclosure allow different vendors to provide proprietary solutions for use on different vendor's mobile devices and/or access points (e.g., eNBs, etc.). Aspects of this disclosure may relieve the standard from the obligation of defining the meanings of individual bits, thereby allowing next-generation standards to define general interactions/relationships between radio control signaling parameters.

In one embodiment, aspects of this disclosure modify mobility prediction and/or handover optimization protocols. More specifically, a generic radio control processor may be configured to perform cell re-selection based on a protocol defined by spoofed control signaling instructions. This may allow for different handover protocols to be utilized by in different network configurations. As an example, it may be possible to reduce battery consumption of mobile devices operating in an idle mode by triggering handovers based on the spatial location of the mobile device within a local radio access network (e.g., cluster of cells), rather than performing scanning frequency sub-bands to compare reference signal received power ratios (RSRPs) of neighboring cells. Aspects of this disclosure may enable implementation of this handover optimization protocol by communicating network mapping information (e.g., topology map) to the mobile device via spoofed radio control signaling.

To achieve this, a next-generation standard telecommunication protocols may define the following: (i) a 'map' format and style; (ii) an SI message to download the map; (iii) a protocol to check the map and perform measurements; (iv) a test suite to check the protocol; and (v) a test suite to check the map downloading. The standard may also adopt the following hooks: (i) the ability to turn off current measurement trigger methods; (ii) the ability to trigger measurements externally (e.g., via external messages); and (iii) the ability for an external message to trigger handover. Each of these definitions and/or hooks are optional, and may be excluded from the standard without disturbing the operability of the adaptable handover optimization protocol.

Aspects of this disclosure use spoofed radio control signaling to reconfigure the type and placement of control information in a radio frame. For example, spoofed radio signaling specifies information/parameters can be used to define information/parameters carried in a physical downlink control channel (PDCCH), thereby allowing the PDCCH to carry control parameters that are defined outside the standard. This signaling may be processed by a dedicated application running on the UE (e.g., an accelerator application) prior to being forwarded to the radio control processor. In an embodiment, the spoofed control signaling may specify TTI scheduling assignments, power control information, modulation and coding scheme information, pilot sequence information, and/or any other control signaling parameter. In another embodiment, the spoofed control signaling implicitly or explicitly signals a HARQ channel location. Features described herein may enable semi-static scheduling to be performed by an accelerator application outside the standard, thereby allowing the scheduling algorithm to be more intricate and specialized. Features described herein may also enable advanced power control schemes, where power control is decided on a per RB basis or is time dependent. While the descriptions above are in the context of a PDCCH in an LTE sub-frame, the underlying concepts are applicable to any control channel/region in any wireless transmission. As used herein, the term "spoofed control signaling" refers to any control signaling that passes through (or originates from) an accelerator application on a device side component of a mobile device.

Features described herein may also enable out of band device-to-device (D2D) co-ordination by giving the same control information to multiple users, thereby allowing UEs to listen to one another's data and co-ordinate outside of the standard. Implied parameters (e.g., UE ID, etc.) may also be added, as well as minor RLC layer changes. Embodiment provided herein may also enable asynchronous HARQ by sending zero assignment to override the synchronous transmission. Embodiments may also pass a received physical downlink control channel (PDCCH) through than accelerator agent, to determine the actual control channel. This would essentially take the control channel information format out of the standard. In order to work a backwards compatible sense the control channels for this type could be orthogonal to the control channels for R8-R10. Techniques for Aspects of this disclosure use spoofed radio control signaling to reconfigure the type and placement of feedback information in wireless communication spectrums. Feedback schemes can be algorithmically complex. Because of this, standards tend to gravitate towards a lowest common denominator solution for feedback schemes, which has been a hurdle to standards' adoption of many advanced schemes, such as multi-user MIMO (MU-MIMO), coordinate multipoint (CoMP) transmission, cluster based forwarding (CBF), and fractional frequency reuse (FFR) schemes. Standards also tend to adopt the solution which performs reasonably well in most scenarios, rather than adopting different solutions for different situations.

Figure 10:
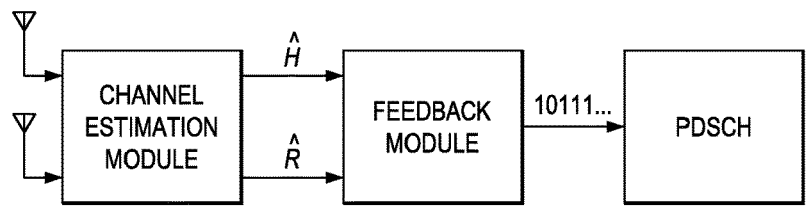
FIG. 10 illustrates a diagram of an embodiment configuration for listening to pilot sequences.

Aspects of this disclosure provide several techniques for re-configuring the feedback schemes outside the standard. FIG. 10 illustrates a diagram of an embodiment configuration for listening to pilot sequences. On every RB, the module calculates the channel $\hat{H}$ to each considered pilot sequence, and an estimated noise covariance $\hat{R}$. This information is then passed to a module which outputs. In an embodiment, the input parameters include the pilot channels monitored, contiguity, and correlation.

Aspects of this disclosure provide the following benefits: Faster turnover time for technologies, as standard changes become less and less necessary; Better performance as solutions can be tailored to specific cases; and Increased uniformity/predictability of UE behavior (e.g. what noise averaging window is used by the UE is now known, or at least override-able).

Aspects of this disclosure allow standards (e.g., LTE, etc.) to be broken down into a series of components, which serve a general purpose and form the building blocks of any communication standard. One embodiment component block corresponds to Rx Channels. This block converts over the air information into data. Examples of which are the PDSCH, PDCCH, PBCH and PHICH. Typically, these channels are communicated according to an active transmission scheme. The reception of one Rx channel may require other Rx channels to be configured correctly. For example, a radio controller may need to know resource assignments, MCS assignments, and transmission modes in order to correctly output information bits in the PDSCH. In an embodiment, the output of a channel is information bits. In another embodiment, the output of a channel is some other data structure, e.g., HARQ process, LLRs, etc.

Another embodiment component block corresponds to controllers, which are blocks that configure the other blocks. In the present LTE system, there is a controller that reads the PDCCH then configures the PDSCH to listen on the assigned resources. Controllers are broken down into two types, privileged controllers manage over-the-air resources, and passive controllers which manage Rx Channels.

Another embodiment component block corresponds to Tx Channels. These channels results in over the air resource expenditure, and consequently may be more tightly controlled than other blocks. They convert information bits into over the air information. Examples of controller blocks control the PUSCH, PUCCH, PRACH, and other physical layer channels. Another embodiment component block corresponds to monitors. These components are in charge of measuring information about the air, and providing that information to the controllers. Examples of monitors are channel estimation, RSRP estimation, etc.

Another embodiment component block corresponds to the information Plane. All of the various blocks (e.g., controllers, channels etc.) may rely on some shared information, such as cell ID, Tx mode, location, UE ID, feedback period, buffer size, transmission state, buffer data, HARQ info, etc. This information may or may not be shared completely between all channels. Shared data may be helpful for interoperability.

Another embodiment component block corresponds to information assessors. To prevent information from having to be shared (e.g., so UE co-operation controllers can have a different UE ID than regular controllers), blocks can be created and overwritten to interface other blocks with the information plane.

Figure 11:
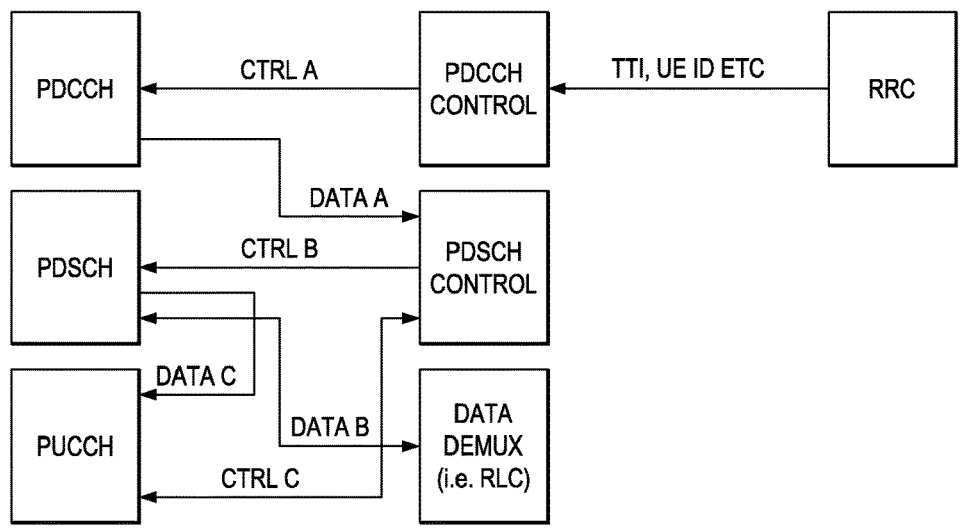
FIG. 11 illustrates a diagram of an embodiment configuration for downlink transmission in LTE networks.

The following is a model based on the LTE standard (release eight), which illustrates how accelerator applications (along with spoofed control signaling) can be used to create adaptable wireless communication environments. FIG. 11 illustrates a diagram of a configuration for downlink transmission in LTE networks. Table 1 below describes the control functions depicted by that diagram. The diagram s describes the current state of LTE release 8. Embodiment solutions could essentially leave this scheme unmodified. To add increased flexibility, the communication between two or more blocks may be passed through an accelerator application, which could reroute, modify, multicast or otherwise pre-process the transmitted data. This would allow multiple blocks to listen to the same PDSCH, which (for example) would allow control information to be communicated in the PDSCH. A subset of the Ctrl data associated with each data message may also be transmitted.

TABLE 1

| Time | Label | Description |
|---|---|---|
| 0 | Ctrl A | This control information configures the PDCCH to attempt to decode a combination of CCEs using a given MCS level, transmission format and transmission scheme. This information also configures the output (If a CRC passes) to be sent to a defined PDSCH controller |
| < | Data A | This information is the 0's and 1's return from the Viterbi decoder, less the CRC bits. |
|  | Ctrl B | The configuration of the PDSCH channel, this includes resources assigned, MCS used, precoder/pilots used, apriori information (i.e. HARQ). It also configures the PDSCH to output 1) ACK/NACK into to the data of PUCCH, 2) Successful data to RLC |
|  | Data B | Successfully decoded data goes into the Data DeMux processed. |
|  | Data C | The ACK/NACK information |
|  | Ctrl C | The configuration of the PUCCH, resources, scrambling sequences, pilot sequences |

Figure 12:
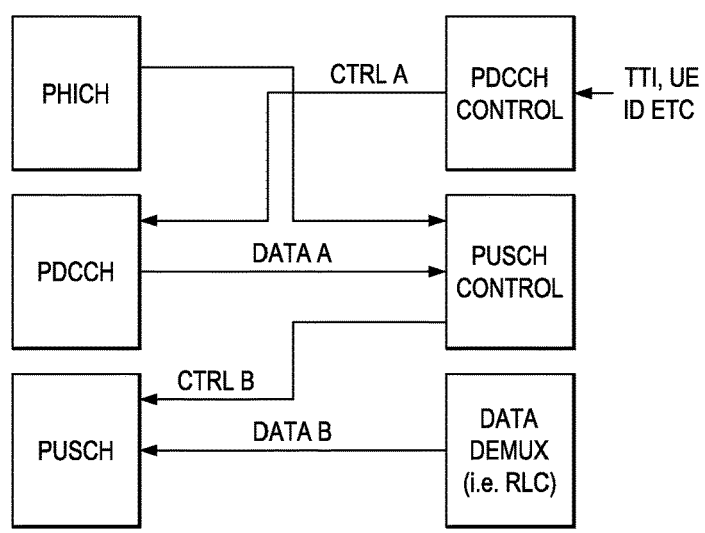
FIG. 12 illustrates a diagram of an embodiment configuration for uplink transmission in LTE networks.
Figure 13:
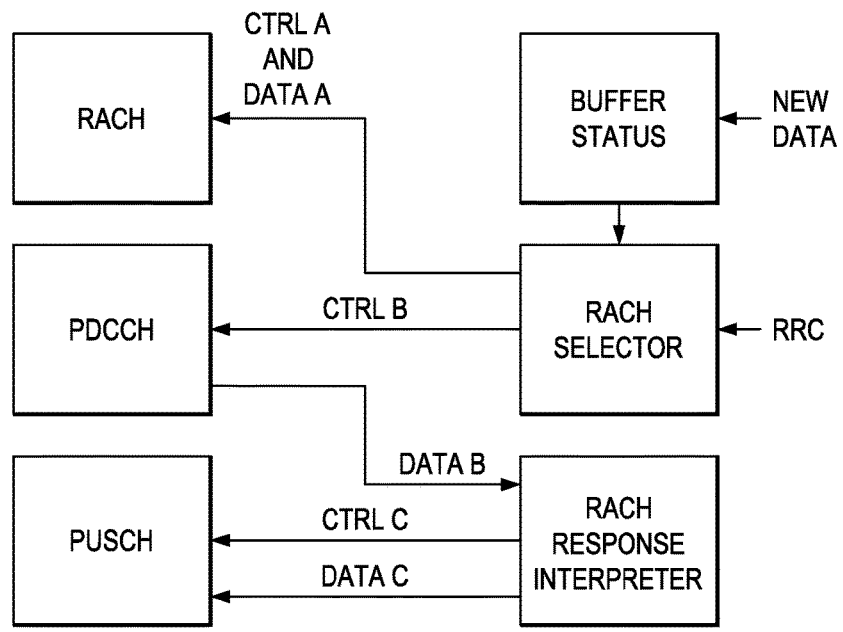
FIG. 13 illustrates a diagram of an embodiment configuration for buffer status and idle paging operations in LTE networks.

FIG. 12 illustrates a diagram of a configuration for uplink transmission in LTE networks. The switch between DRX mode and active mode in the UE affects the PDCCH Controller in the UE and the scheduler in the eNB, as well as the power amplifier (PA). FIG. 13 illustrates a diagram of a configuration for buffer status and idle paging operations in LTE networks. The control blocks in this figure may be relatively tightly linked, except for the PUSCH configuration. Table 2 below describes the control functions depicted by that diagram.

TABLE 2

| Time | Label | Description |
|---|---|---|
| 0 | Ctrl A | Which RACH channel to use (i.e. time/Frequency |
|  | Data A | Which sequence to use a number from 0-N. |
|  | Ctrl B | Which PDCCH to listen to and their configuration for response. |
|  | Data B | Random Access Response (Timing alignment, UL grant, C-RNTI) |
|  | Ctrl C | The configuration of the PUSCH channel. |
|  | Data C | Data identifying the UE for further transmission, Buffer Status etc. |

Figure 14:
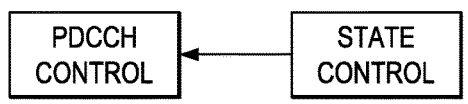
FIG. 14 illustrates a diagram of an embodiment configuration for DRX/DTX signals in LTE networks.

FIG. 14 illustrates a diagram of a configuration for DRX/DTX signals in LTE networks, which may be useful in the short-term. This example may use mirrored processing techniques in both the eNB and the UE as the eNB also needs to be aware of configuration information. In an embodiment, this feature is removed from the standard by having a representation of the DRX that is configured externally, e.g., in a non-causal manner.

Embodiments of this disclosure allow for adaptive cell re-selection. In conventional networks, radio control processors may be configured perform cell selection by scanning all carrier frequencies to identify candidate carriers frequencies associated with acceptable public land mobile network (PLMN) identifiers (IDs), and then selecting the candidate carrier frequency having the highest reference signal received power level (RSRP). Aspects of this disclosure allow a generic radio control processor to use location information to skip poor-performing bands to significantly reduce power consumption.

Figure 15:
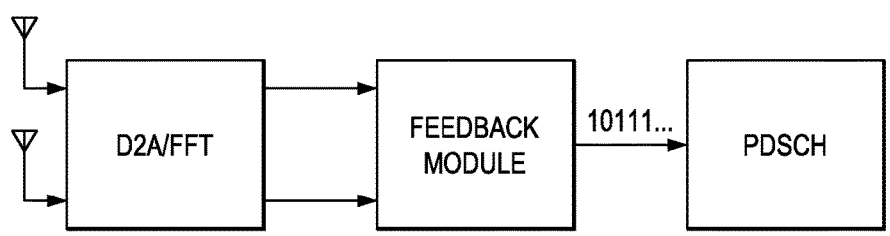
FIG. 15 illustrates a diagram of an embodiment configuration for providing feedback relating to a physical downlink shared channel (PDSCH) in an LTE network.

FIG. 15 illustrates a diagram of an embodiment configuration for providing feedback to the PDSCH in an LTE network. Various control parameters may be set by spoofed radio control signaling, including buffer status updates, random access channel (RACH) utilization instructions, synchronization/timing update procedures, system interconnection (SI) signaling/compression instructions, wireless channel parameters (e.g., parameters associated with the physical downlink control channel (PDCCH), physical uplink shared channel (PUSCH), physical broadcast channel (PBC), downlink shared channel (DSCH), etc.), and others.

Accelerator applications may be used to adapt various functions, including: Paging/Cell association; Buffer status Update/RACH use; Fragmentation; Prioritization (e.g., which data is given priority); ARQ; FEC (e.g., new FEC codes, unequal error protection, FEC for SIC, etc.); SIC (temporal and otherwise); Channel Estimation (e.g., second order statistics can be communicated through many side channels, including location based or perhaps based on channel id, etc. This feature may allow sharing of external software); RAN2; SI compression (e.g., passing the data in the SI messages through one or more translator translators may improve compression); Active/idol/DRX/DTX state optimization; RACH procedure; and Timing update procedures (e.g., location based timing updates could be performed based on maps);

Embodiments of this disclosure can be implemented in various ways. In an embodiment, control channel adaptation can be achieved through a 'virtual PDCCH' which does not correspond to any over the air transmission. In another embodiment, control channel adaptation can be achieved through a 'translated PDCCH' in which the information contained in the over-the-air PDCCH is pre-processed by an accelerator application to determine the actual information contained. From a high level, these two embodiments may be primarily differentiated by their input parameters.

In regards to the virtual PDCCH embodiment: The contents of the channel are outside the scope standard. The UE PHY receives a message from outside the standard which proscribes all fields associated with configuring PDSCH/PUSCH. As this message does not use over the air resources, it can conceivable be quite large, and essentially all options on a per RB/RE basis. Different channels (PDSCH etc.) are in fact defined by these configuration messages. To reduce messaging, default and dependent parameters can be configurable. Advantageously, this embodiment may place fewer restrictions on the standard than other approaches.

In regards to the translated PDCCH embodiment: This embodiment may offer significant flexibility without completely isolating PDCCH processing operations from the standard. This embodiment may create a set of meta-functions which can be configured to process this data. These meta-functions would be received by the LTE-PHY and used to generate the configuration of the channels from that data. The simplest and most versatile is a simple table lookup converting the $2^x$ possibilities from the PDCCH to the y bits required to configure the PDSCH. The memory requirements for this scheme can be quite large, thus simplifications may be helpful. The language of these instructions could be specified, along with a complexity limitation. It could be a high level language like JAVA (e.g., open source gateway initiative (OSGi)), C++, Very High Speed Integrated Circuit (VHL) Hardware Description Language (VHDL), or low level languages such as assembly.

Figure 16:
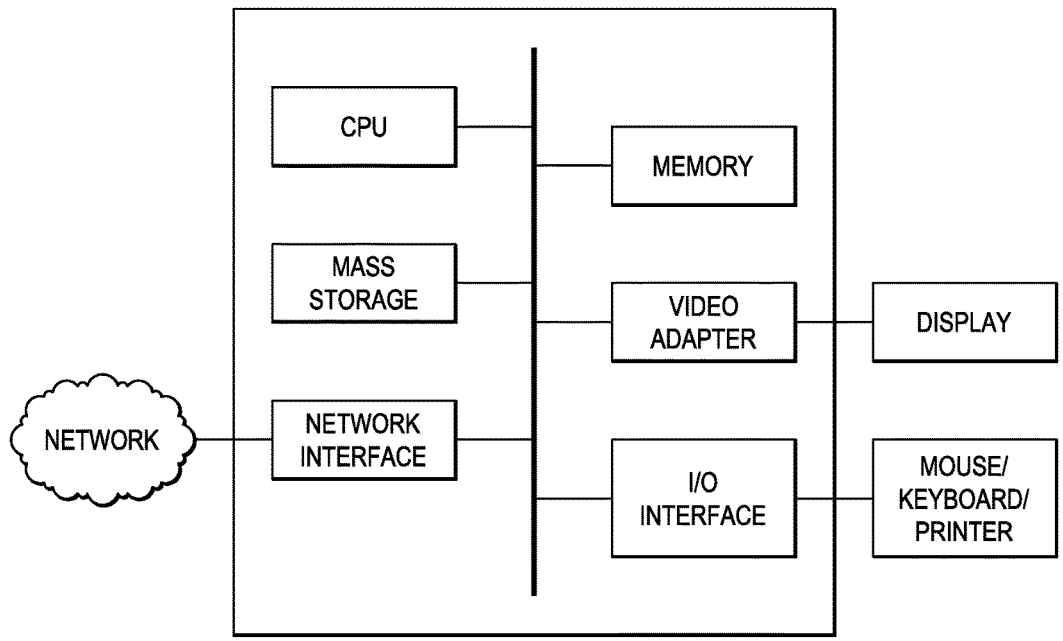
FIG. 16 illustrates a diagram of an embodiment processing system.

FIG. 16 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 17:
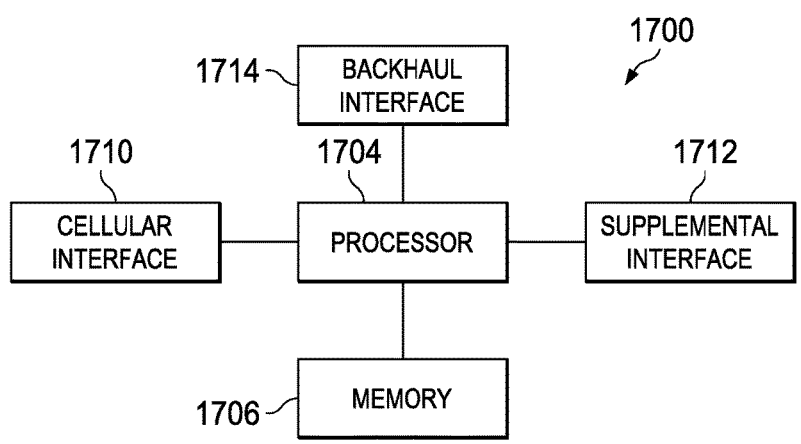
FIG. 17 illustrates a diagram of an embodiment communications device.

FIG. 17 illustrates a block diagram of an embodiment of a communications device 1700, which may be equivalent to one or more devices (e.g., UEs, NBs, etc.) discussed above. The communications device 1700 may include a processor 1704, a memory 1706, a cellular interface 1710, a supplemental interface 1712, and a backhaul interface 1714, which may (or may not) be arranged as shown in FIG. 17. The processor 1704 may be any component capable of performing computations and/or other processing related tasks, and the memory 1706 may be any component capable of storing programming and/or instructions for the processor 1704. The cellular interface 1710 may be any component or collection of components that allows the communications device 1700 to communicate using a cellular signal, and may be used to receive and/or transmit information over a cellular connection of a cellular network. The supplemental interface 1712 may be any component or collection of components that allows the communications device 1700 to communicate data or control information via a supplemental protocol. For instance, the supplemental interface 1712 may be a non-cellular wireless interface for communicating in accordance with a Wireless-Fidelity (Wi-Fi) or Bluetooth protocol. Alternatively, the supplemental interface 1712 may be a wireline interface. The backhaul interface 1714 may be optionally included in the communications device 1700, and may comprise any component or collection of components that allows the communications device 1700 to communicate with another device via a backhaul network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:
1. A method comprising:
establishing, by a radio control processor of a user-side mobile device, a radio connection between a wireless interface of the user-side mobile device and an access point;
receiving, over a network-side port of the radio control processor, a downlink transmission carrying radio control signaling and data signaling from the access point, wherein spoofed radio control signaling is embedded within the data signaling and wherein the spoofed radio control signaling is distinct from the radio control signaling;
forwarding the data signaling, carried by the downlink transmission, to a device-side component of the user-side mobile device for extracting the spoofed radio control signaling from the data signaling and processing the spoofed radio control signaling to translate the spoofed radio control signaling into control instructions, wherein the control instructions govern processing of a downlink data channel transmission by the radio control processor;

receiving, over a device-side port of the radio control processor, the control instructions from the device-side component of the user-side mobile device; and managing, by the radio control processor, the radio connection between the user-side mobile device and the access point in accordance with configuration instructions carried by the radio control signaling and in accordance with the control instructions received from the device-side component.

2. The method of claim 1, wherein the device-side component is coupled to the device-side port of the radio control processor.

3. The method of claim 1, wherein the radio control signaling is communicated via the transport layer, and wherein the spoofed radio control signaling is communicated via the network layer.

4. The method of claim 1, wherein managing the radio connection between the user-side mobile device in accordance with configuration instructions carried by the radio control signaling and in accordance with the control instructions received from the device-side component comprises:
performing cell re-selection in accordance with a cell-reselection map carried by the spoofed radio control signaling.

5. The method of claim 4, wherein performing cell re-selection in accordance with the cell-reselection map comprises:
identifying a sub-set of carrier frequencies in accordance with the cell-reselection map, the sub-set of carrier frequencies including fewer than all carrier frequencies of a frequency band available for cell-reselection; and
scanning the sub-set of carrier frequencies in the frequency band without scanning carrier frequencies excluded from the sub-set of carrier frequencies.

6. The method of claim 1, wherein managing the radio connection between the user-side mobile device in accordance with configuration instructions carried by the radio control signaling and in accordance with the control instructions received from the device-side component comprises:
triggering a handover in accordance with a handover instruction carried by the spoofed radio control signaling.

7. The method of claim 1, wherein the control instructions specify parameters of an uplink transmission of the radio control processor.

8. A user-side mobile device comprising:
a wireless interface for establishing a radio connection between the user-side mobile device and an access point of a core network, and for receiving a downlink transmission carrying radio control signaling and data signaling from the access point, wherein spoofed radio control signaling is embedded within the data signaling and wherein the spoofed radio control signaling is distinct from the radio control signaling;
a radio control processor for managing the radio connection between the user-side mobile device and the core network; and
a device-side component for receiving the data signaling carried by the downlink transmission received over the wireless interface, extracting the spoofed radio control signaling from the data signaling, and processing the spoofed radio control signaling to translate the spoofed radio control signaling into control instructions, wherein the control instructions govern processing of a downlink data channel transmission by the radio control processor, the radio control processor comprising a network-side port communicatively coupled to the wireless interface and a device-side port communicatively coupled to the device-side component of the user-side mobile device,
wherein the radio control processor is configured to receive the radio control signaling carried by the downlink transmission over the network-side port, to receive the control instructions from the device-side component over the device-side port, and to manage the radio connection in accordance with configuration instructions carried by the radio control signaling and in accordance with the control instructions received from the device-side component.

9. The user-side mobile device of claim 8, wherein the data signaling and the radio control signaling are multiplexed in the downlink transmission.

10. The user-side mobile device of claim 8, wherein the radio control signaling is communicated via the transport layer, and wherein the spoofed radio control signaling is communicated via the network layer.

11. The user-side mobile device of claim 8, wherein control instructions specify parameters of an uplink transmission of the radio control processor.

12. A method comprising:
establishing, by a radio control processor of a user-side mobile device, a radio connection between a wireless interface of the user-side mobile device and an access point;
receiving, over a network-side port of the radio control processor, a downlink transmission from the access point,
forwarding data signaling carried by the downlink transmission to a device-side component of the user-side mobile device for extracting spoofed radio control signaling from the data signaling and processing the spoofed radio control signaling to translate the spoofed radio control signaling into control instructions, wherein spoofed radio control signaling is embedded within the data signaling, wherein the spoofed radio control signaling is distinct from the radio control signaling, and wherein the control instructions govern processing of a downlink data channel transmission by the radio control processor;
receiving, over a device-side port of the radio control processor, the control instructions from the device-side component of the user-side mobile device; and
processing, by a radio control processor, the downlink transmission in accordance with the control instructions received from the device-side component.

13. The method of claim 12, wherein the control instructions specify a transmission time interval for the downlink transmission.

14. The method of claim 13, wherein the control instructions specify a scheduling assignment for downlink transmission.

15. A user-side mobile device comprising:
a wireless interface for establishing a radio connection between the user-side mobile device and an access point of a core network, and for receiving a downlink transmission carrying radio control signaling and data signaling from the access point, wherein spoofed radio control signaling is embedded within the data signaling, and wherein the spoofed radio control signaling is distinct from the radio control signaling;
a device-side component for receiving the data signaling carried by the downlink transmission; and
a radio control processor for managing the radio connection between the user-side mobile device and the core network, the radio control processor comprising a network-side port communicatively coupled to the wireless interface and a device-side port communicatively coupled to the device-side component, wherein the radio control processor is configured to receive the downlink transmission via the network-side port, to forward the data signaling over the device-side port to the device-side component to receive the control instructions from the device-side component over the device-side port, and to process the downlink transmission in accordance with configuration instructions carried by the radio control signaling and in accordance with the control instructions received from the device-side component, wherein the device-side component is configured to extract the spoofed radio control signaling from the data signaling and process the spoofed radio control signaling to translate the spoofed radio control signaling into control instructions, and to return the control instructions associated with the spoofed radio control signaling to the radio control processor; and wherein the control instructions govern processing of a downlink data channel transmission by the radio control processor.

16. A method comprising:

establishing, by a radio control processor of a user-side mobile device, a radio connection between a wireless interface of the user-side mobile device and an access point;

receiving, over a network-side port of the radio control processor, a downlink transmission from the access point;

forwarding data signaling, carried by the downlink transmission, to a device-side component of the user-side mobile device for extracting spoofed radio control signaling from the data signaling and processing the spoofed radio control signaling to translate the spoofed radio control signaling into control instructions, wherein spoofed radio control signaling is embedded within the data signaling, wherein the spoofed radio control signaling is distinct from radio control signaling carried by the downlink transmission, and wherein the control instructions govern processing of a downlink data channel transmission by the radio control processor;

receiving, over a device-side port of the radio control processor, the control instructions associated with the spoofed radio control signaling embedded within the data signaling from the device-side component of the user-side mobile device; and performing, by the radio control processor, an uplink transmission in accordance with the control instructions received from the device-side component.

17. The method of claim 16, wherein the control instructions specify a power control parameter for the uplink transmission.

18. The method of claim 16, wherein the control instructions specify configuration information for a feedback channel communicated in the uplink transmission.

19. The method of claim 16, wherein the data signaling and the radio control signaling are multiplexed in the downlink transmission.

* * * * *